United States Patent
Winfield et al.

(10) Patent No.: US 6,937,778 B2
(45) Date of Patent: Aug. 30, 2005

(54) SENSOR ARRAYS HAVING LIGHT-POWERED TRANSDUCERS

(75) Inventors: Donald W. Winfield, Camillus, NY (US); Joseph L. Chovan, North Syracuse, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/396,175

(22) Filed: Mar. 25, 2003

(65) Prior Publication Data

US 2004/0190811 A1 Sep. 30, 2004

(51) Int. Cl.[7] .............................. G02B 6/00; G02B 1/00
(52) U.S. Cl. ............................ 385/12; 385/13; 385/14; 385/89; 367/149; 367/154
(58) Field of Search ........................ 385/12–13, 24–34, 385/88–94; 367/24, 117, 131, 149, 154; 356/27–28, 370, 614; 350/96; 428/209; 250/227.14

(56) References Cited

U.S. PATENT DOCUMENTS

| 4,437,175 | A | * | 3/1984 | Berni ........................... 367/24 |
|---|---|---|---|---|
| 4,628,493 | A | * | 12/1986 | Nelson et al. ................. 367/79 |
| 4,743,752 | A | * | 5/1988 | Olsen et al. ............... 250/206.1 |
| 4,777,661 | A | * | 10/1988 | Spillman, Jr. ................ 398/168 |
| 5,051,965 | A | | 9/1991 | Poorman ..................... 367/149 |
| 5,117,400 | A | * | 5/1992 | Penn et al. .................. 367/128 |
| 5,199,100 | A | | 3/1993 | Maas et al. ................. 385/139 |
| 5,353,262 | A | | 10/1994 | Yakymyshyn et al. ...... 367/149 |
| 5,359,445 | A | | 10/1994 | Robertson .................... 359/151 |
| 5,407,730 | A | * | 4/1995 | Imanaka ..................... 428/209 |
| 5,671,191 | A | | 9/1997 | Gerdt .......................... 367/140 |
| 5,978,525 | A | * | 11/1999 | Shu et al. ...................... 385/12 |
| 6,009,216 | A | * | 12/1999 | Pruett et al. .................. 385/12 |
| 6,212,314 | B1 | | 4/2001 | Ford ............................ 385/30 |
| 6,314,811 | B1 | | 11/2001 | Goldner et al. ............... 73/370 |
| 6,350,983 | B1 | | 2/2002 | Kaldor et al. ............. 250/231.1 |
| 6,422,506 | B1 | * | 7/2002 | Colby ..................... 244/1 TD |
| 6,462,808 | B2 | | 10/2002 | Paritsky et al. ............. 356/4.01 |

\* cited by examiner

Primary Examiner—Frank G. Font
Assistant Examiner—Ryan Lepisto
(74) Attorney, Agent, or Firm—Plevy, Howard & Darcy, PC

(57) ABSTRACT

A sensor array includes a plurality of sensor locations at which sensed signals are produced. A tension element holds locations at a given maximum spacing. The tension element includes an optical fiber. Light propagating on the optical fiber is applied to converters at each location for generating electrical power for the electrically powered portions of the array. The electrically powered portions may be a part of the sensor suite at each location, telemetry equipment, or both.

15 Claims, 7 Drawing Sheets

SENSOR ARRAYS HAVING LIGHT-POWERED TRANSDUCERS

FIELD OF THE INVENTION

This invention relates to sensor arrays, and more particularly to the powering of sensors and sensor ancillary equipment from an optical fiber.

BACKGROUND OF THE INVENTION

Sonar towed arrays may include a large number of acoustic pressure sensors, as for example in the range of 200 to 700, spaced along a tow line. In addition, non-acoustic sensors, such as hydrostatic pressure (depth), temperature, magnetic heading, pitch, and roll sensors may be placed at various locations along the tow line, including at those locations associated with an acoustic pressure sensor. In addition, each sensor location is associated with a telemetry arrangement for transmitting the sensor signal, or at least a signal related to the sensor signal, to the towed end of the array. The telemetry equipment at each sensor location on the array must be powered, so in addition to whatever electrically conductive or optical signal path or paths extend from the various sensors to the towed end of the array, there must also be electrically conductive power conductors for transmitting energization voltage to at least the telemetry equipment.

Improved sensor arrays are desired.

SUMMARY OF THE INVENTION

An array according to an aspect of the invention includes at least a first sensor for sensing an environmental condition and for generating a first signal in response thereto, and a second sensor for sensing the environmental condition and for generating a second signal in response thereto. A tension element is coupled to the first and second sensors for tending to keep the first and second sensors at first and second locations separated by a physical spacing no greater than a given amount. A first electrically operated transducer is co-located with the first sensor and electrically coupled thereto for receiving the first signal and for transmitting at least a signal related to the first signal to a node of the array. A second electrically operated transducer is co-located with the second sensor and electrically coupled thereto for receiving the second signal and for transmitting at least a signal related to the second signal to a node of the array. The first and second electrically operated transducers each include a terminal for receiving energizing potential. A light-carrying optical fiber extends between the first and second locations. A light-to-electric converter located at each of the first and second locations receives light from the optical fiber, and converts the light into the energizing potential.

In a particular embodiment, at least some of the sensors comprise pressure sensors, and may comprise acoustic pressure sensors. In another version of this aspect, the tension element may comprise the optical fiber. In one version of this aspect of the invention, the light-to-electric converter may comprise a solar cell, and in another version the light-to-electric converter comprises a photodiode.

In another version of this aspect of the invention, the first sensor may comprise an acceleration sensor, and an integrator is coupled to the acceleration sensor for converting acceleration signals into velocity signals. In a particular version of this aspect, the integrator is an electrically operated integrator including a terminal for receiving the energizing potential. The acceleration sensor may include a micro electro mechanical system.

DESCRIPTION OF THE INVENTION

Figure 1:
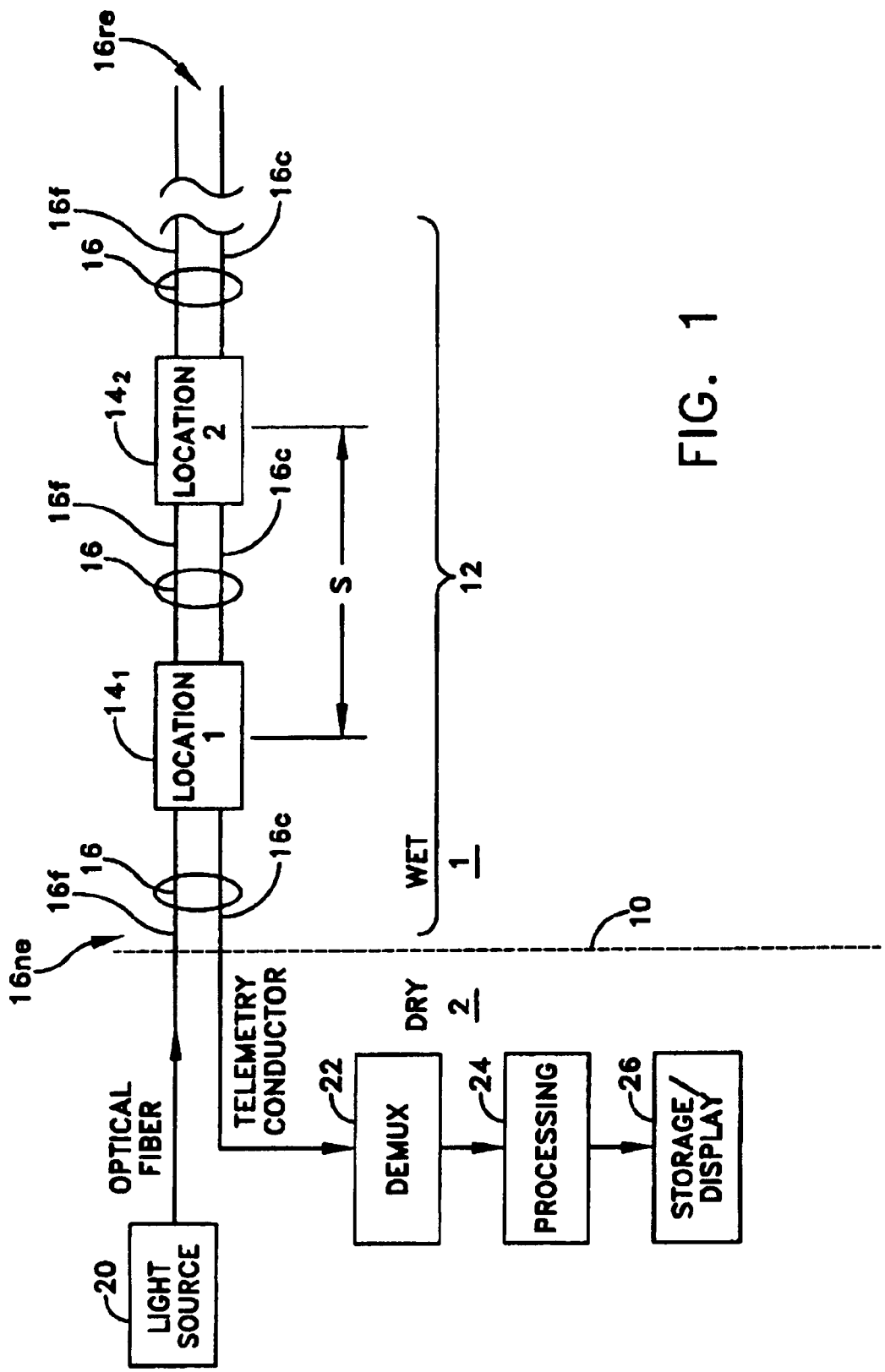
FIG. 1 is a simplified diagram in block and schematic form illustrating a towed underwater array including plural sensor nodes.

FIG. 1 is divided by a dash line 10 into "wet" and "dry" portions, corresponding to the ocean 1 and a boat or ship 2 thereon, respectively. A towed array designated generally as 12 includes a plurality of sensor locations, two of which are designated $14_1$ and $14_2$, respectively. There may be additional sensor locations (not illustrated) remote from the dry portion of FIG. 1. Ship 2 may be considered to be a main or head node of the array 12. A tension element designated as 16 extends from the ship to locations $14_1$ and $14_2$, for keeping the locations along the tension element at a substantially fixed separation, illustrated as S. Other locations (not illustrated) may be spaced apart by S or by some other distance, as the situation may require. The movement of the ship causes the various portions of tension element 16 and the locations therealong to trail behind the ship. The most remote portion of the towed array 12 is illustrated as a remote end 16re.

Tension element 16 of FIG. 1 includes an optical fiber illustrated as a line 16f and also includes a telemetry conductor illustrated as a line 16c. Line 16c may also be part of a multiconductor cable, or may alternatively be a part of a coaxial cable. Preferably, telemetry line 16c comprises an optical fiber for transmitting optical signals representing the telemetry data flowing from each of the sensor locations to the dry signal processing electronics. The telemetry data may include acoustic andor nonacoustic sensor data. If necessary, it may also include a strength member, if the strength of the optical fiber 16f andor the electrical conductor 16c is insufficient.

The dry side 2 of line 10 of FIG. 1 includes a source of light illustrated as a block 20 coupled to the near end 16ne of the optical fiber 16f, for propagating light through the fiber 16f toward the remote end 16re of the tension element 16. The dry side 2 of conductor 16c is coupled to a demultiplexer 22, if necessary to separate signals returning to the ship from the towed array 12. The demultiplexed signals are applied to signal processing illustrated as block 24 for producing signals representing organized sensed information, and the organized information is made available for storage andor display, illustrated as block 26.

Figure 2:
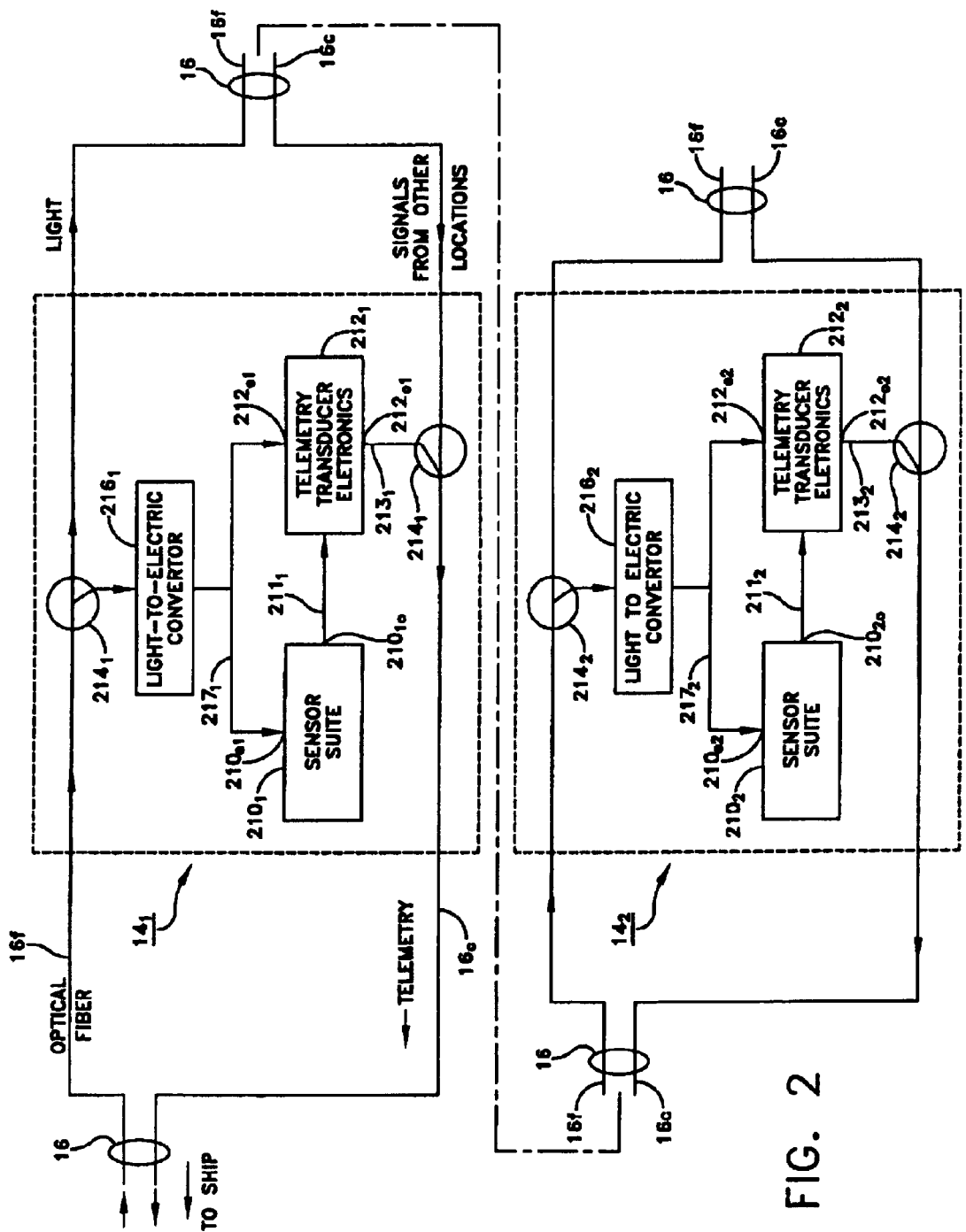
FIG. 2 is a simplified diagram in block and schematic form illustrating some details of sensor nodes of the arrangement of FIG. 1.

FIG. 2 is a simplified diagram in block and schematic form, illustrating the constituents of any one of the locations $14_1, 14_2, \ldots$ along the towed array. In FIG. 2, the locations are designated as $14_1$ and $14_2$ for definiteness. Location $14_1$ includes a sensor suite illustrated as a block $210_1$. Sensor suite $210_1$ may include acoustic pressure sensors such as fiber optic acoustic sensors or micro electric mechanical systems (MEMS) acoustic sensors, and non-acoustic sensors for temperature, hydrostatic pressure, heading or bearing, GPS, and the like, including non-acoustic MEMS sensors, some or all of which may require electrical energization or power. For the purpose of receiving electrical energization power, block $210_1$ is illustrated as including an electrical terminal or electrode $210e1$. The results of the sensing are produced as sensed signals at an output port $210_1o$ of block $210_1$. The sensed signals are provided by a path illustrated as $211_1$ to telemetry electronics, illustrated as a transducer block $212_1$; the signals flowing over path $211_1$ are referred to as signals $211_1$. Telemetry electronics $212_1$ receives the various sensed signals, and processes them for transmission, as for example by digitizing, compression, andor preprocessing. The processed or transduced signals produced by telemetry electronics $212_1$ are transmitted by way of an output port $212o1$, a path $213_1$, and a directional coupler $214_1$ in an upstream direction over conductor 16, which is to say toward the dry portion 2 of the towing ship of FIG. 1, corresponding to the head or main node of the array 12 of FIG. 1. The signals from telemetry block $212_1$ flowing over path $213_1$ are referred to as a telemetry signal, which is related to the sensor signal. For purposes of being powered by electrical energization, block $212_1$ is illustrated as including an electrical terminal or electrode $212e1$. Location $14_2$ includes a sensor suite illustrated as a block $210_2$. Sensor suite $210_2$ may include acoustic pressure sensors (including fiber optic acoustic sensors), micro electric mechanical systems (MEMS) sensors, non-acoustic sensors for temperature, hydrostatic pressure, heading or bearing, GPS, and the like (including non-acoustic MEMS sensors), some or all of which may require electrical energization or power. For the purpose of receiving electrical energization power, block $210_2$ is illustrated as including an electrical terminal or electrode $210e2$. The results of the sensing are produced as sensed signals at an output port $210_2o$ of block $210_2$. The sensed signals are provided by a path illustrated as $211_2$ to telemetry electronics, illustrated as a block $212_2$; the signals flowing over path $211_2$ are referred to as signals $211_2$. Telemetry electronics $212_2$ receives the various sensed signals, and processes them for transmission, as for example by digitizing, compression, andor preprocessing, and transmits the resulting processed signal by way of an output port $212o2$, a path $213_2$, and a directional coupler $214_2$ in an upstream direction, which is to say toward the towing ship over conductor $16c$. The signals from telemetry block $212_2$ flowing over path $213_2$ are referred to as a telemetry signal, which is related to the sensor signal. For purposes of being powered by electrical energization, block $212_2$ is illustrated as including an electrical terminal or electrode $212e2$.

According to an aspect of the invention, light is propagated through optical fiber $16f$ in a downstream direction from the ship 2, which is to say that the light propagates from main or head node 2 toward remote end $16re$ of the tension element, passing through all the locations (only locations $14_1$ and $14_2$ illustrated). At location $14_1$ of FIG. 2, a portion of the light propagating through optical fiber $16f$ is coupled by way of an optical sampler $214_1$ to a light-to-electric converter illustrated as a block $216_1$. The optical sampler $214_1$ may be, for example, a directional coupler such as a star coupler. The light-to-electric converter $216_1$ may be, for example, a solar cell or a semiconductor junction. The output of block $216_1$ is electrical energy. The electrical energy is coupled from block $216_1$ by way of a path $217_1$ to terminals or electrodes $210e1$ and/or $212e1$ of blocks 210 and 212, respectively, for energization of those portions requiring electrical power. That portion of the light which is not coupled from optical fiber $16f$ of FIG. 2 at location $14_1$ proceeds along fiber $16f$ and eventually arrives at location $14_2$. At location $14_2$ of FIG. 2, a portion of the light propagating through optical fiber $16f$ is coupled by way of an optical sampler or coupler, such as directional coupler $214_2$, to a light-to-electric converter illustrated as a block $216_2$. The light-to-electric converter $216_2$ may be a solar cell or a semiconductor junction. The output of block $216_2$ is electrical energy. The electrical energy is coupled from block $216_2$ by way of path $217_2$ to terminals or electrodes $210e2$ andor $212e2$ of blocks $210_2$ and $212_2$, respectively, for energization of those portions requiring electrical power.

Those skilled in the art know that the coupling of optical samplers can be selected or controlled so that no more energy is extracted from the propagating light power than is needed at a given location, and that portion of the light which is not extracted from optical fiber $16f$ at a given location propagates "downstream" toward other locations or, after the last location, toward remote end $16re$.

Those skilled in the art also know that a directional coupler such as directional coupler $214_1$ of FIG. 2 allows signal to be inserted onto a bus with low loss to the signal flowing on the main signal path $16c$. In operation, the light propagates downstream from ship 2 of FIG. 1 toward each location $14_1, 14_2, \ldots$ and a portion of the light is extracted at each location for powering the sensor or sensor suite at that location (if necessary) andor any ancillary equipment at that location, such as the telemetry equipment at that location. The sensor suites at the various locations operate, producing sensed signals related to the location in question. The sensed signals at each location are coupled to the telemetry equipment at that location, which processes the signals, and multiplexes them (if necessary) for transmission over the conductor $16c$. One effective means for multiplexing is the use of a different carrier frequency for each location, in which case the demultiplexing block 22 of FIG. 1 would include frequency-selective filters. Another multiplexing technique is the use of code-division multiplex, in which case demultiplexing block 22 would include code division equipment. Other multiplexing and demultiplexing schemes are known and may be used. Multiplexing would not be necessary in the event that sufficient individual channels were available through the tension element 16, as might be the case if there were a separate conductor $16c$ for each location, rather than a single conductor $16c$ as illustrated.

Figure 3:
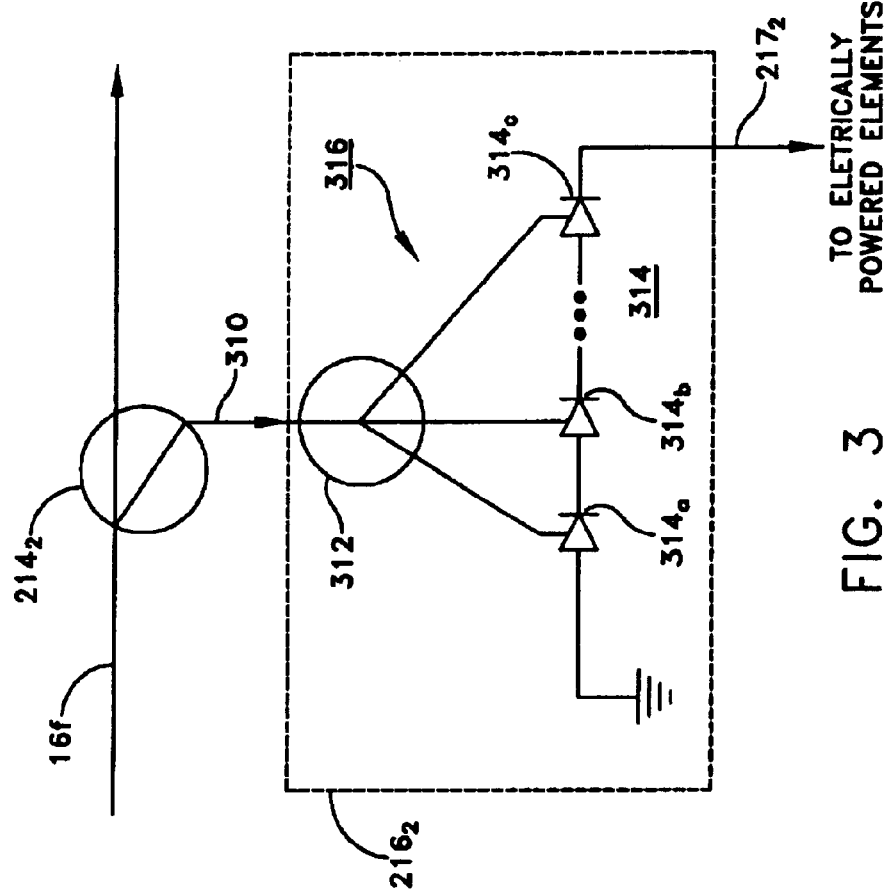
FIG. 3 is a simplified diagram in block and schematic form illustrating some details of a typical light-to-electric converter which may be used at a location of FIG. 2.

The light provided to a light-to-electric converter, such as $214_1$ or $214_2$ of FIG. 2, could be applied to a single light-to-electric conversion cell. Such cells usually have a maximum output voltage, which may be, for example 0.7 volts. This may not be sufficient voltage to operate some electrically powered equipment. FIG. 3 is a simplified diagram in block and schematic form which illustrates details of one embodiment of light-to-electric converter, illustrated as converter $216_2$ for definiteness. In FIG. 3, light propagates from the tap of coupler $214_2$ by way of an optical path 310 to a further star coupler 312, which divides the light received from path 310 into a plurality of optical fibers. A plurality 314 of cascaded optical converters 314a, 314b, . . . , 314c is illustrated by diode symbols. These converters may be solar cells, optoelectric diodes, or the like, which produce voltage in response to application of light thereto. By being electrically coupled in series in a cascade, converters 314, when illuminated, are capable of producing a voltage equal to the sum of their individual voltages. The optical star coupler 312 provides light by way of a plurality of optical fibers, designated together as 316, to the plural, cascaded or series-connected light-to-electric converters 314a, 314b, . . . , 314c, thereby producing a voltage which becomes available on conductor $217_2$ for use by utilization apparatus, which in the case of FIG. 2 corresponds to at least the electricity users in telemetry block $212_2$.

Figure 4:
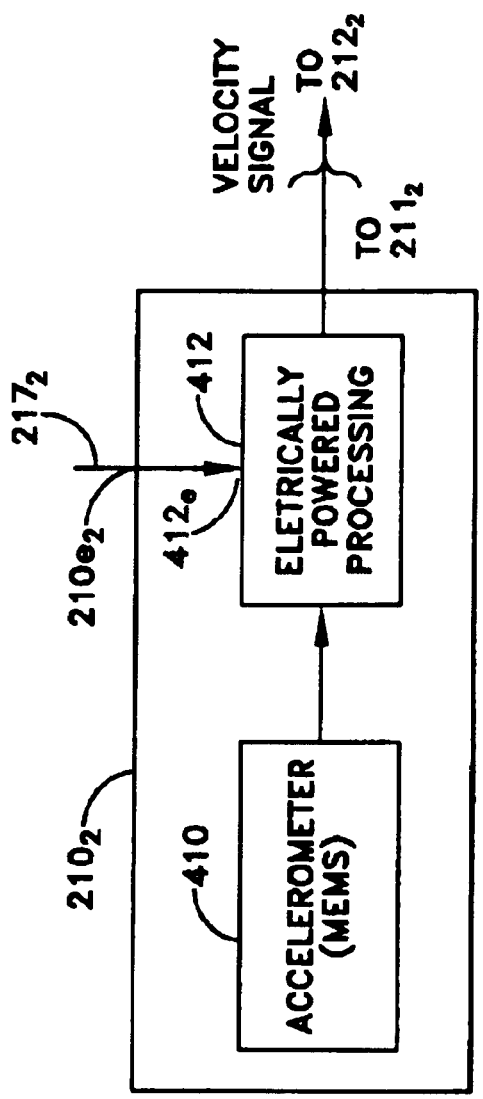
FIG. 4 is a simplified diagram in block and schematic form illustrating some details of one possible embodiment of a sensor suite of FIG. 2.

FIG. 4 is a simplified diagram in block and schematic form illustrating one possible arrangement which may be included in a sensor suite, such as sensor suite $210_2$ of FIG. 2. In FIG. 4, sensor suite $210_2$ is illustrated as including a passive accelerometer 410, which produces signals for application to an electrically powered integrator block 412. Electrical power is applied to block 412 by way of electrical input port 210e2 and 412e of FIG. 4. Processing 412 may include an analog-to-digital converter coupled with a digital accumulator, as known in the art.

In a preferred embodiment of the invention, each sensor suite comprises an integrated MEMS (microelectromechanical) sensor chip containing one or more acoustic or non-acoustic sensing elements and associated signal conditioning electronics. Fabrication of such MEMS chips is accomplished using photolithography techniques, for example, similar to those used for fabrication of integrated circuits. A solar cell formed on each MEMS chip is operated for receiving input optical power from optical fiber 16f and converting the optical power into electrical power for driving the electronics on the MEMS sensor chip. Long metal cable conductors for the provision of electrical power are thus eliminated from the towed array, thereby reducing the per-unit weight, and therefore the corresponding diameter of the cable array required to maintain neutral buoyancy of the array. The transmission of the sensed array information through the towing cable by way of an optical fiber(s) rather than by way of an electrical cable conductor set tends to further reduce the per-unit weight of the towing cable.

Figure 5:
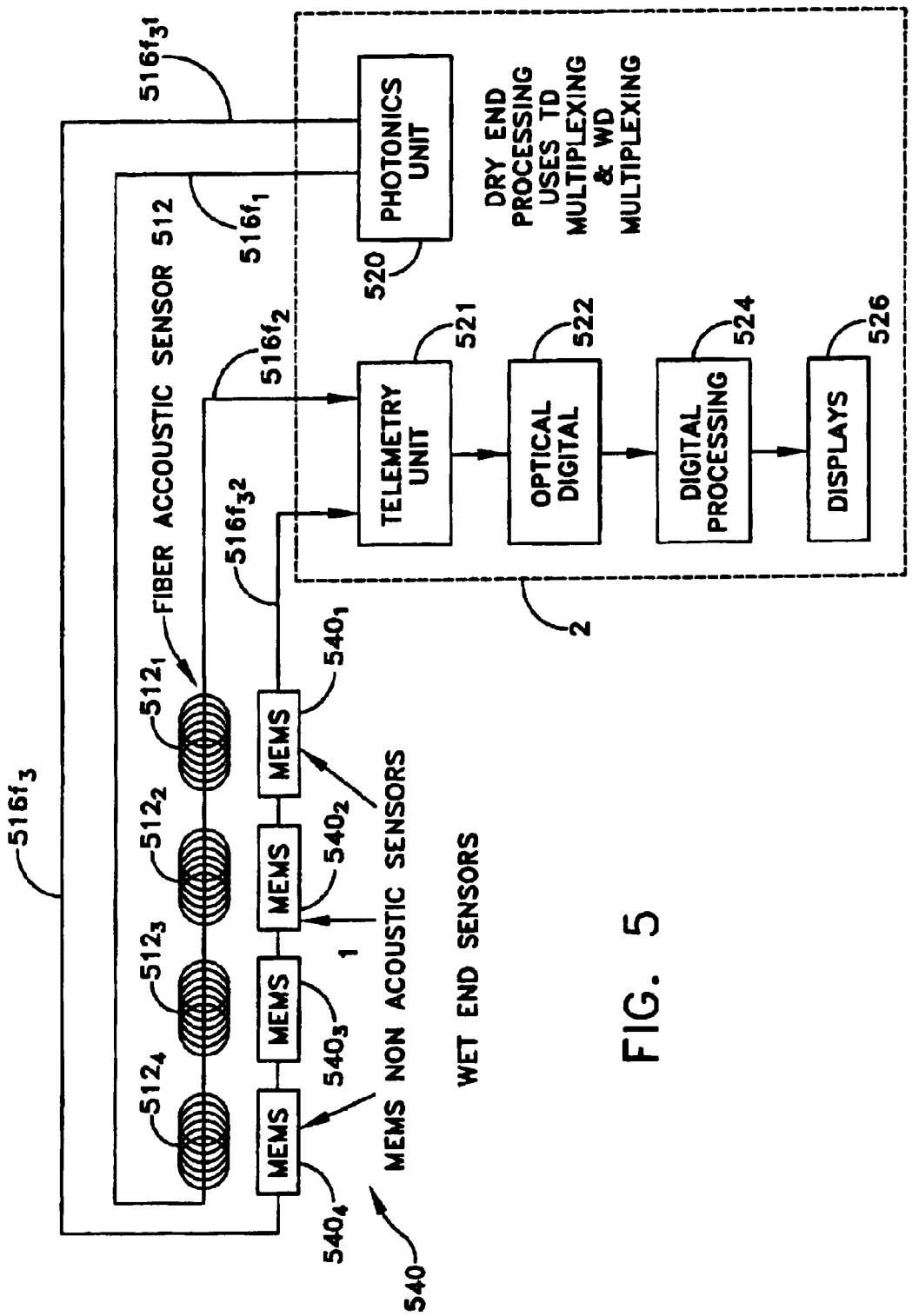
FIG. 5 is a simplified diagram in block and schematic form illustrating a first preferred embodiment according to an aspect of the invention, in which fiber acoustic sensors and non-acoustic MEMS sensors are used.

FIG. 5 is a simplified diagram in block and schematic form, illustrating a first preferred embodiment according to an aspect of the invention. In FIG. 5, the wet end of the array 12 is designated 1, and the dry end with processing is designated 2. The array 12 includes a line array 512 of four fiber optic acoustic sensors $512_1$, $512_2$, $512_3$, $512_4$ connected by optical fiber $516f_1$ to a photonics unit 520 located in dry portion 2 for receiving light therefrom, and also connected by way of an optical fiber $516f_2$ to a telemetry unit 521, for transmitting information thereto.

Also in FIG. 5, an array 540 of MEMS non-acoustic sensors includes non-acoustic MEMS sensors $540_1$, $540_2$, $540_3$, and $540_4$ for generating other sensed signals. At least some of the non-acoustic MES sensors are co-located with corresponding ones of the fiber acoustic sensors of array 512. As illustrated, each non-acoustic MEMS sensor $540_1$, $540_2$, $540_3$, and $540_4$ is co-located with a fiber acoustic sensor $512_1$, $512_2$, $512_3$, and $512_4$, respectively. Operating energy is provided from photonics unit 520 to array 540 by way of a first portion $516f_31$ of an optical fiber $516f_3$, and each element $540_1$, $540_2$, $540_3$, and $540_4$ of array 540 extracts a portion of the light energy for energizing Its operation. As described in conjunction with FIG. 3, the light energy can be converted into electrical energy for energization purposes. The array 540 of MEMS sensors $540_1$, $540_2$, $540_3$, and $540_4$ includes encodes the sensed information for transmission over a second portion $516f_32$ of optical fiber $516f_3$. Second portion $516f_32$ of optical fiber $516f_3$ carries the sensed information in photonic form to telemetry unit 521 of FIG. 5.

In FIG. 5, telemetry unit 521 receives the sensed signal information, and separates it if necessary. An optical-to-digital converter 522 converts the optical signals into electrical digital signals suitable for processing by block 524. The processed signals are made available to a display 526.

Figure 6:
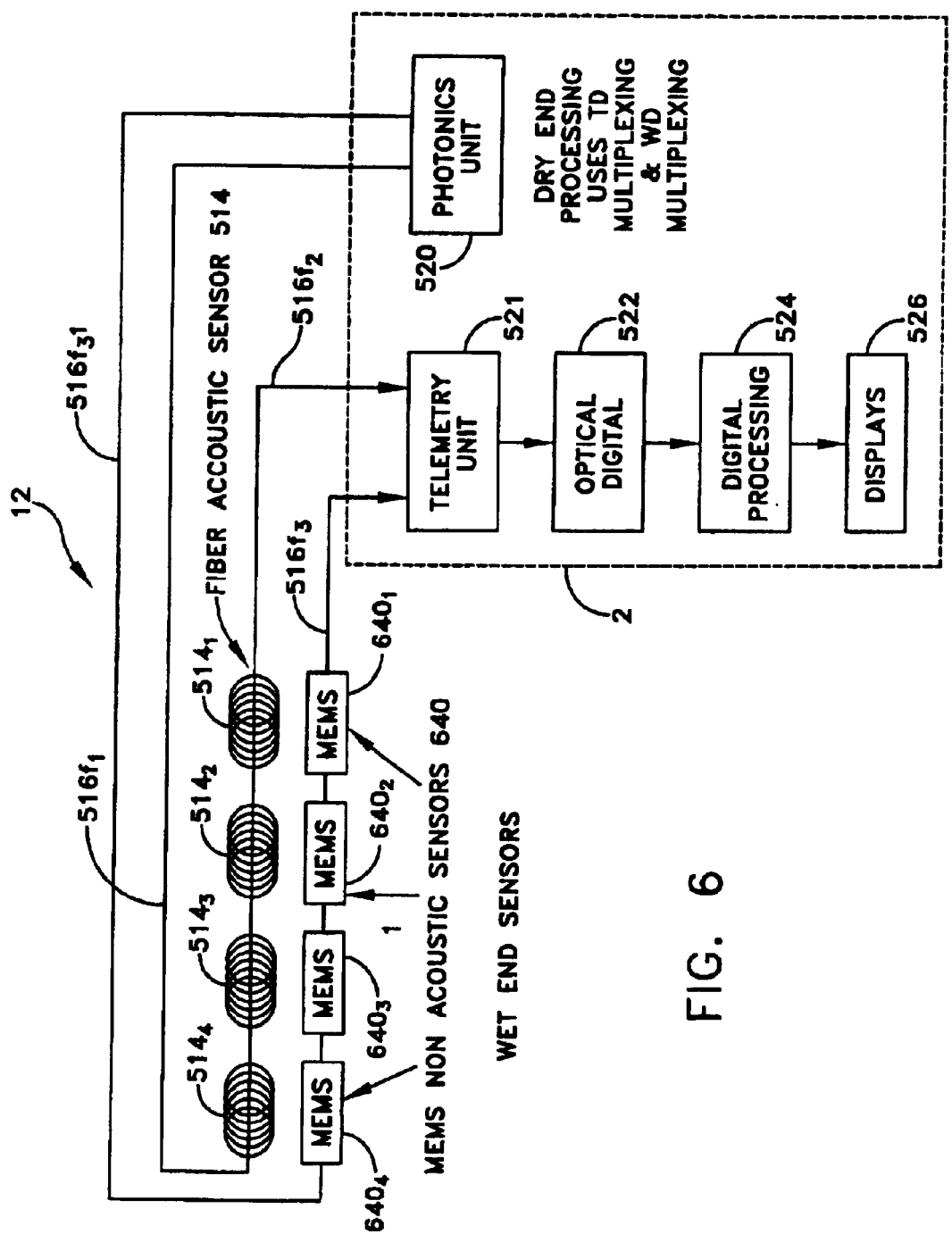
FIG. 6 is a second preferred embodiment similar to FIG. 5, in which fiber acoustic sensors, MEMS acoustic and non-acoustic sensors are used.

FIG. 6 is similar to FIG. 5, and corresponding elements are designated by like reference numerals. In FIG. 6, the MEMS sensor array 640 includes MEMS sensors $640_1$, $640_2$, $640_3$, and $640_4$, at least some of which provide both acoustic and non-acoustic sensing functions.

Figure 7:
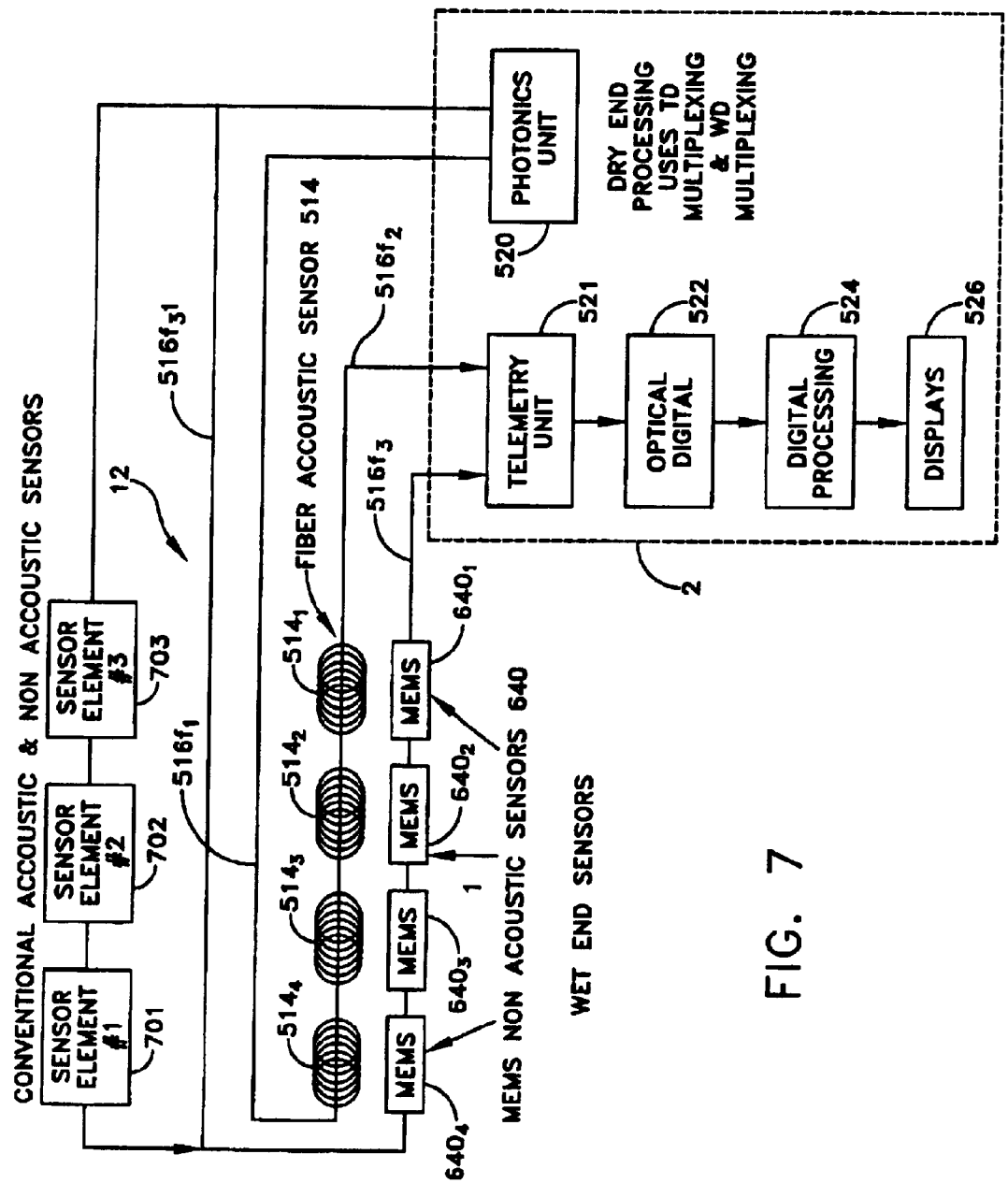
FIG. 7 is another embodiment similar to FIG. 5 including a mix of acoustic and non-acoustic fiber optic, MEMs, and conventional non-MEMs sensors.

Other embodiments of the invention will be apparent to those skilled in the art. For example, Another embodiment of the insertion could be a mix of Fiber Optic, MEMS and conventional Non-MEMS sensors 701, 702, 703 such as magnetic heading sensors and/or conventional ceramic sensors, as shown in FIG. 7.

Thus, an array (12) according to an aspect of the invention includes at least a first sensor ($210_1$) for sensing an environmental condition and for generating a first signal ($211_1$) in response thereto, and a second sensor ($210_2$) for sensing the environmental condition and for generating a second signal ($211_2$) in response thereto. A tension element (16) is coupled to the first ($210_1$) and second ($210_2$) sensors for tending to keep the first ($210_1$) and second ($210_2$) sensors at first ($14_1$) and second ($14_2$) locations separated by a physical spacing (S) no greater than a given amount. A first electrically operated transducer ($210_1$) is co-located with the first sensor ($210_1$) and electrically coupled thereto for receiving the first signal ($211_1$) and for transmitting at least a signal ($213_1$) related to the first signal ($211_1$) to a node (2) of the array (12). A second electrically operated transducer ($210_2$) is co-located with the second sensor ($210_2$) and electrically coupled thereto for receiving the second signal ($211_2$) and for transmitting at least a signal ($213_2$) related to the second signal ($211_2$) to a node (2) of the array (12). The first ($212_1$) and second ($212_2$) electrically operated transducers each include a terminal (212e1 and 212e2, respectively) for receiving energizing potential. A light-carrying optical fiber (16f) extends between the first and second locations. A light-to-electric converter ($216_1$, $216_2$) located at each of the first ($14_1$) and second ($14_2$) locations receives light from the optical fiber (16f), and converts the light into the energizing potential.

In a particular version of this aspect of the invention, at least some of the sensors ($210_1$, $210_2$) comprise pressure sensors, and may comprise acoustic pressure sensors. In another version of this aspect, the tension element (16) may comprise the optical fiber. In one version of this aspect of the invention, the light-to-electric converter ($216_1$, $216_2$) may comprise a solar cell, and in another version the light-to-electric converter comprises a photodiode.

In another version of this aspect of the invention, the first sensor ($210_1$) may comprise an acceleration sensor (410), and an integrator (412) coupled to the acceleration sensor (410) for converting acceleration signals into velocity signals. In a particular version of this aspect, the integrator (412) is an electrically operated integrator including a terminal (412e) for receiving the energizing potential. The acceleration sensor (410) may include a micro electro mechanical system (MEMS).

What is claimed is:

1. An array of sensors, spaced apart by a tension element, said array comprising:
   - a first sensor for sensing an environmental condition and for generating a first signal in response thereto;
   - a second sensor for sensing said environmental condition and for generating a second signal in response thereto;
   - a tension element coupled to said first and second sensors for tending to keep said first and second sensors at first and second locations separated by a physical spacing no greater than a given amount;
   - a first electrically operated transducer co-located with said first sensor and coupled thereto for receiving said first signal and for transmitting at least a signal related to said first signal to a node of said array, said first electrically operated transducer including a terminal for receiving energizing potential;
   - a second electrically operated transducer co-located with said second sensor and coupled thereto for receiving said second signal and for transmitting at least a signal related to said second signal to a node of said array, said second electrically operated transducer including a terminal for receiving energizing potential;
   - a light-carrying optical fiber extending between said first and second locations; and
   - a light-to-electric converter located at each of said first and second locations for receiving light from said optical fiber, and for converting said light into said energizing potential.

2. An array according to claim 1, wherein at least some of said sensors comprise pressure sensors.

3. An array according to claim 1, wherein said tension element comprises said optical fiber.

4. An array according to claim 1, wherein said light-to-electric converter comprises a solar cell.

5. An array according to claim 1, wherein said light-to-electric converter comprises a photodiode.

6. An array according to claim 1, wherein said first sensor comprises:
   - an acceleration sensor; and
   - an integrator coupled to said acceleration sensor for converting acceleration signals into velocity signals.

7. An array according to claim 6, wherein said integrator is an electrically operated integrator including a terminal for receiving said energizing potential.

8. An array according to claim 6, wherein said acceleration sensor is a micro electro mechanical system.

9. An array according to claim 1, wherein said light-to-electric converter comprises a light coupler coupled to said optical fiber for coupling a sample of said light from said optical fiber.

10. An array according to claim 9, wherein said light coupler is directional.

11. An array according to claim 1, further comprising an array of fiber acoustic sensors at locations along said tension element, said array of fiber acoustic sensors being coupled to a source of light by a further optical fiber, and producing sensed signals on a third optical fiber.

12. An array according to claim 11, wherein at least some of said fiber acoustic sensors of said array of fiber acoustic sensors are co-located with said first and second sensors.

13. An array according to claim 1, wherein the first sensor comprises a micro electro mechanical system (MEMs) circuit formed on an electronic chip.

14. An array according to claim 13, wherein the light to electric converter comprises a solar cell formed on said electronic chip.

15. An array according to claim 14, wherein said at least one signal related to said first signal from said first transducer comprises an encoded optical signal for propagation to said node of said array.

* * * * *